Sept. 13, 1938.　　　　J. E. WHITFIELD　　　　2,130,054
BLOWER
Filed July 2, 1935　　　　5 Sheets-Sheet 1

INVENTOR.
Joseph E Whitfield
BY
ATTORNEYS.

Sept. 13, 1938. J. E. WHITFIELD 2,130,054
BLOWER
Filed July 2, 1935 5 Sheets-Sheet 2

INVENTOR
Joseph E Whitfield
BY
ATTORNEYS.

Sept. 13, 1938.   J. E. WHITFIELD   2,130,054
BLOWER
Filed July 2, 1935   5 Sheets-Sheet 3

INVENTOR
Joseph E. Whitfield
BY
T. C. Lord
ATTORNEYS.

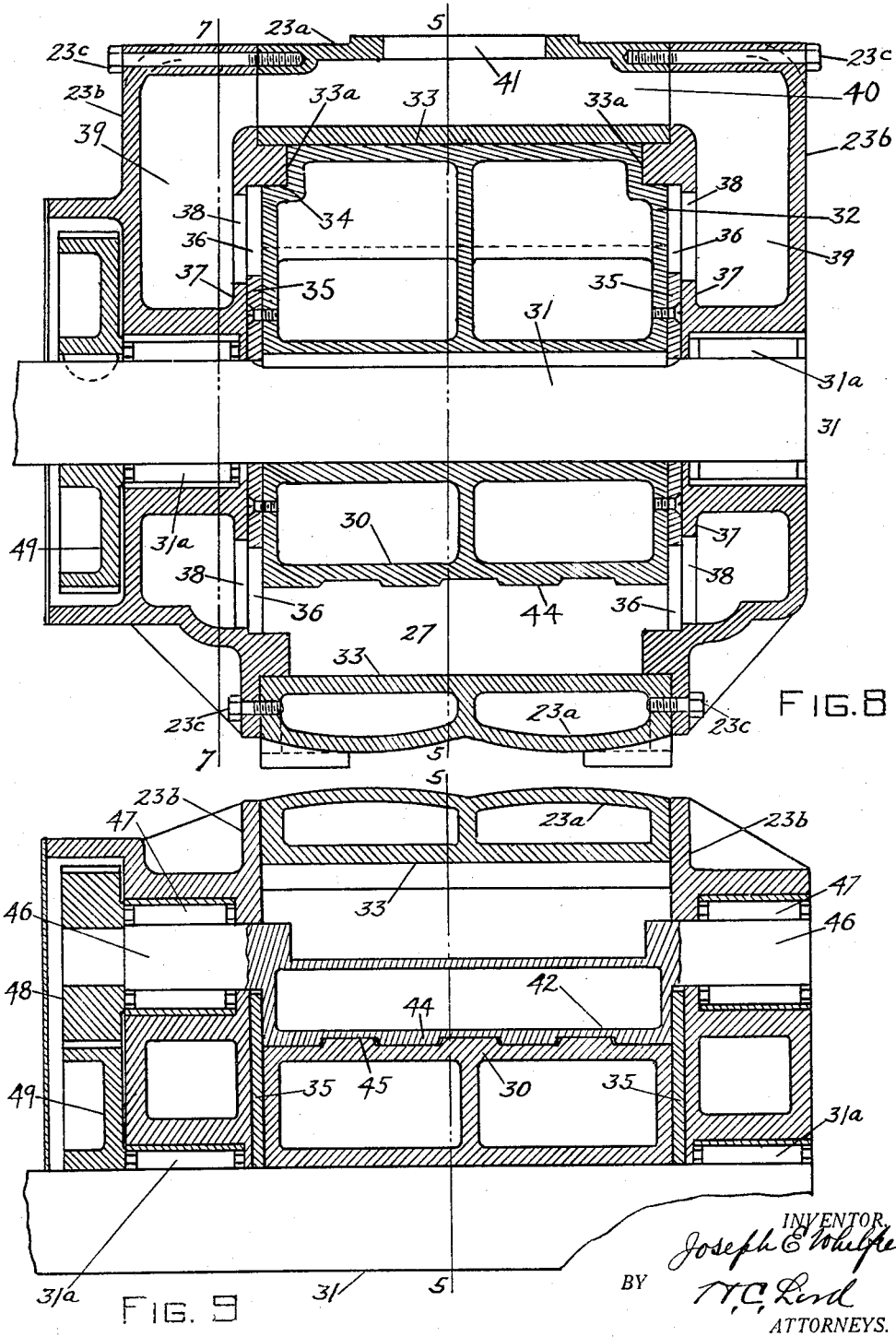

Sept. 13, 1938.    J. E. WHITFIELD    2,130,054
BLOWER
Filed July 2, 1935    5 Sheets-Sheet 5
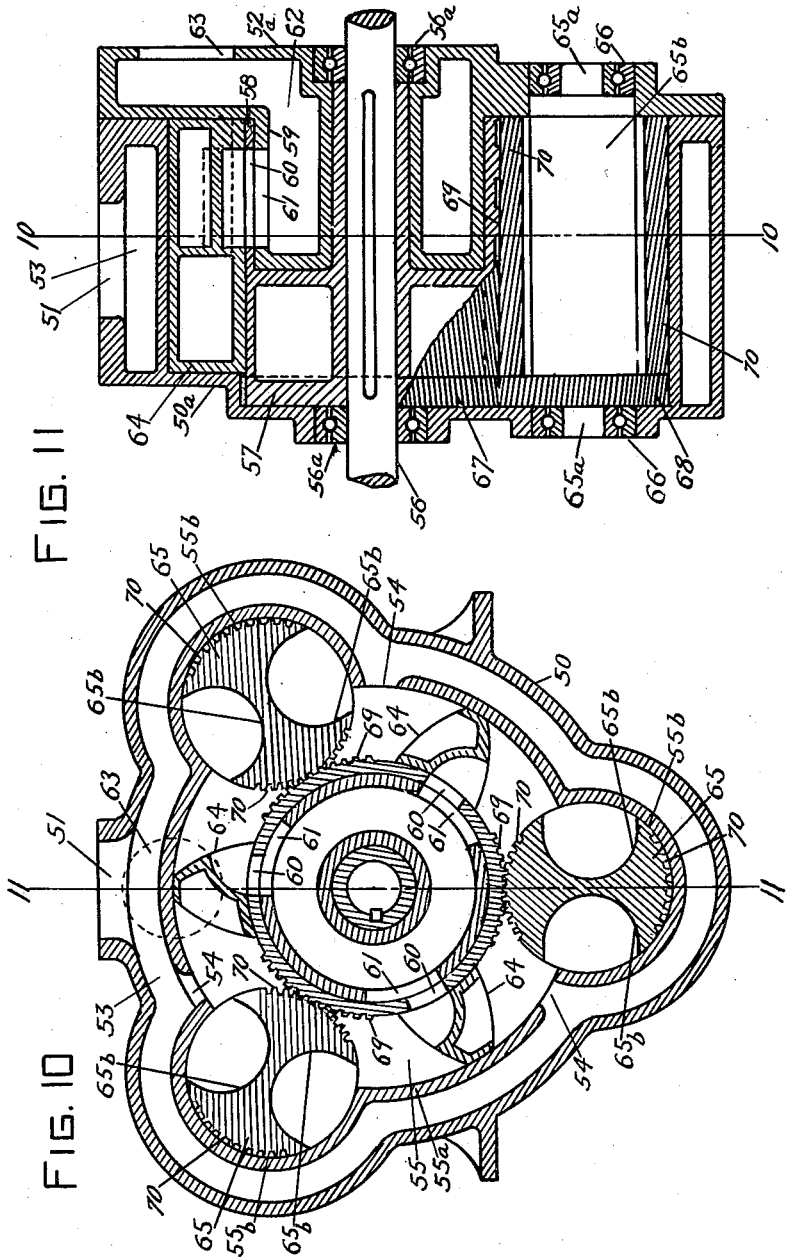
INVENTOR.
Joseph E. Whitfield
BY
ATTORNEYS.

Patented Sept. 13, 1938

2,130,054

UNITED STATES PATENT OFFICE 2,130,054

BLOWER

Joseph E. Whitfield, Grove City, Pa.

Application July 2, 1935, Serial No. 29,525

1 Claim. (Cl. 230—150)

The invention is directed to blowers of the type involving a positive displacement. The object of the invention is to improve the efficiency of such blowers by permitting smooth high speeds involving small frictional losses and free movement of air to and from the blower. In carrying out the invention and in the effort to permit of high speeds the parts are formed preferably to involve substantial balance of the moving parts, the sealing is effected with small frictional losses and the volumetric efficiency is provided for by large exhaust and inlet ports, these ports being controlled by the rotating parts without auxiliary valves. Features and details of the invention will appear from the specification and claim.

A preferred embodiment of the invention is illustrated in the accompanying drawings as follows:

Fig. 8 is a section on the line 8—8 in Fig. 5.

Fig. 9 is a section on the line 9—9 in Fig. 5.

Fig. 10 is a section on the line 10—10 in Fig. 11, showing a further modification.

Fig. 11 is a section on the line 11—11 in Fig. 10.

Figure 1:
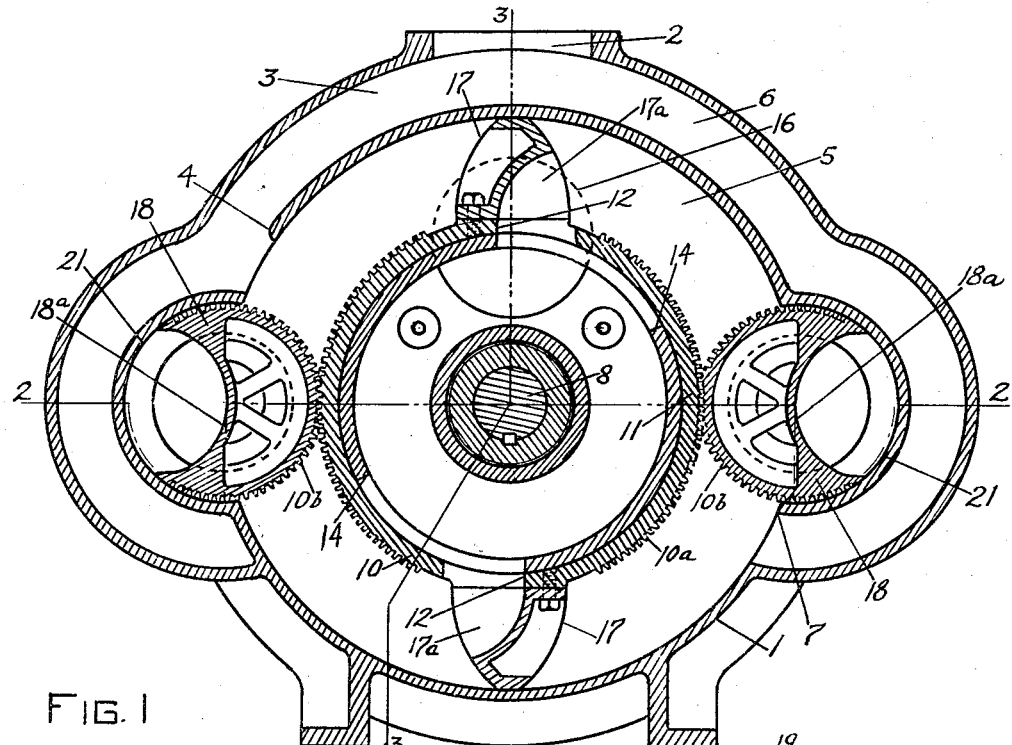
Fig. 1 shows a section on the line 1—1 in Fig. 2.
Figure 2:
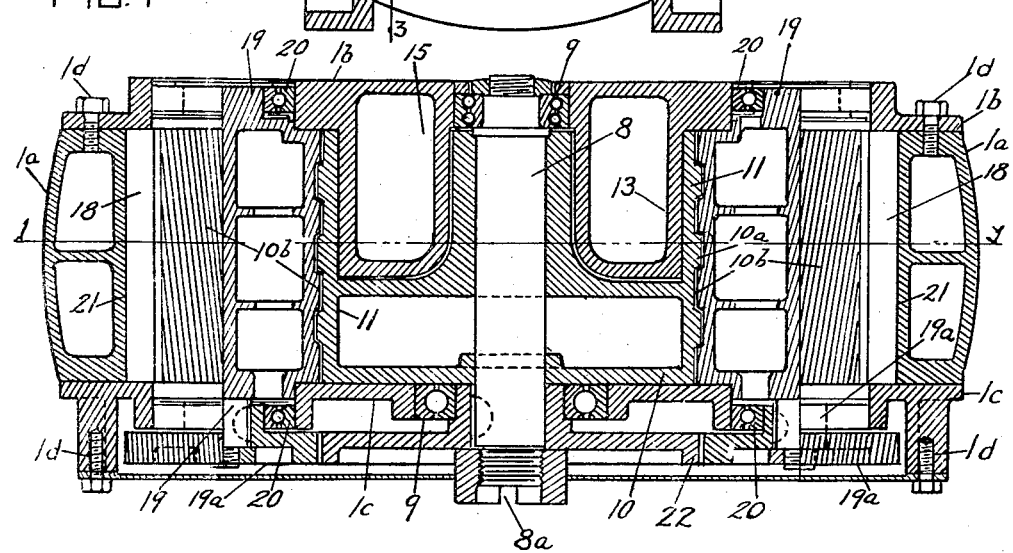
Fig. 2 is a section on the line 2—2 in Fig. 1.
Figure 3:
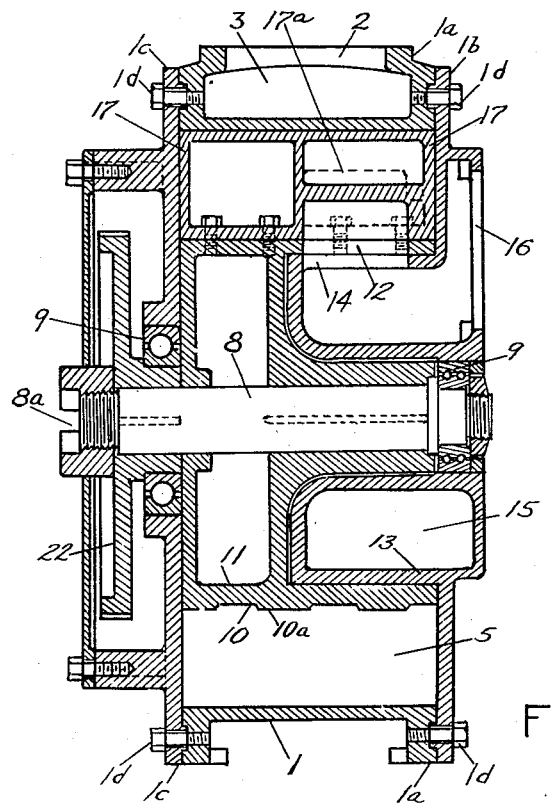
Fig. 3 is a section on the line 3—3 in Fig. 1.
Figure 4:
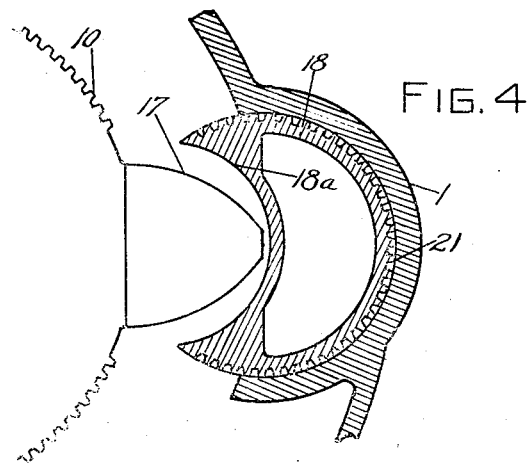
Fig. 4 shows a detached view of the gate and driving abutments with the abutment in the gate.

In the modification shown in Figs. 1 to 4, 1 marks the case. This is made up of a central portion 1a and side portions 1b and 1c secured to the central portion by screws 1d. 2 marks the inlet passage leading to the case, 3 a branch from the inlet passage, said branch being provided with a port 4 leading to a compression space, or chamber 5, and 6 a second branch of the inlet passage leading around the case and terminating in a port 7 to the compression space.

A drive shaft 8 is journaled in the case preferably by ball bearings 9 and is provided with a clutch detent end 8a from which the shaft may be driven from any convenient power. A rotor 10 is fixed on the shaft. It has a peripheral closure wall 11, a part of said wall over-hanging from the rotor in the form of a flange. This wall has ports 12. A closure wall 13 is formed in the case and operates in conjunction with the overhanging portion of the wall 11. The closure wall is provided with ports 14 which are adapted to be brought into and out of register with the ports 12. The port 14 leads to an annular exhaust passage 15 discharging from the case through a discharge outlet 16. The rotor has driving fluid driving vanes 17 positively oppositely placed on the rotor. These have small openings 17a in the face which lead into the ports 12. These vanes form a closure with the peripheral wall of the case and the rotor with the vanes forms a closure along the side walls of the case. Rotary gates 18 are oppositely placed in the case. These gates have trunnions 19 which are journaled in ball bearings 20 in the case. The gates are cylindrically shaped and form a closure with gate pockets 21 in the case, these pockets extending outwardly from the peripheral closing wall of the case. The gates have vane grooves 18a which are adapted to receive, as the rotor and gates are rotated, the vanes as they reach the gates. The gates also form a closure with the periphery of the rotor except during the passing of the vanes through the gates. The ports 14 are closed during the passage of the vanes through the gates. It will be noted that the rotor is twice the diameter of the gates, so that in this modification, the gates make two revolutions to one of the rotor. By pluralizing the vanes and gates, the space in relation to the capacity of the blower is reduced. This also tends to balance the rotor and moving parts both as to pressure and weight.

A gear 22 is fixed on the shaft 8 and meshes with gears 19a fixed on the end of one of the trunnions. The pitch line of these gears corresponds to the diameters of the rotor and gates so that they are maintained in perfect timing relation through this gear connection. The rotor is provided with teeth 10a and the gates with corresponding teeth 10b. The bases and the crests of the teeth form a fairly close closure whereas the sides of the teeth may not be in close contact as the driving of the rotor and the gates is intended to be accomplished entirely through the gears 22 and 19a. The teeth 10a and 10b are slightly helical, extending less than a full turn around the rotor and gate so that there is a slight leakage at the end of each tooth. The purpose of this is to induce a slight leakage of air through them so as to clear these teeth from any accumulation. These teeth form a labyrinth which without undue friction maintain an efficient closure. These teeth are preferable but may be omitted and closure maintained on the cylindrical surfaces. By reason of the ball bearings and maintenance of the rotor in relation to the case surfaces the vanes and the peripheral wall of the case may be relieved entirely of actual wear contact and this is also true of the gates so that frictional resistance to the driving of the blower is reduced to a minimum because the relation of the closing surfaces may be maintained within reasonable oil sealing distance.

Figure 5:
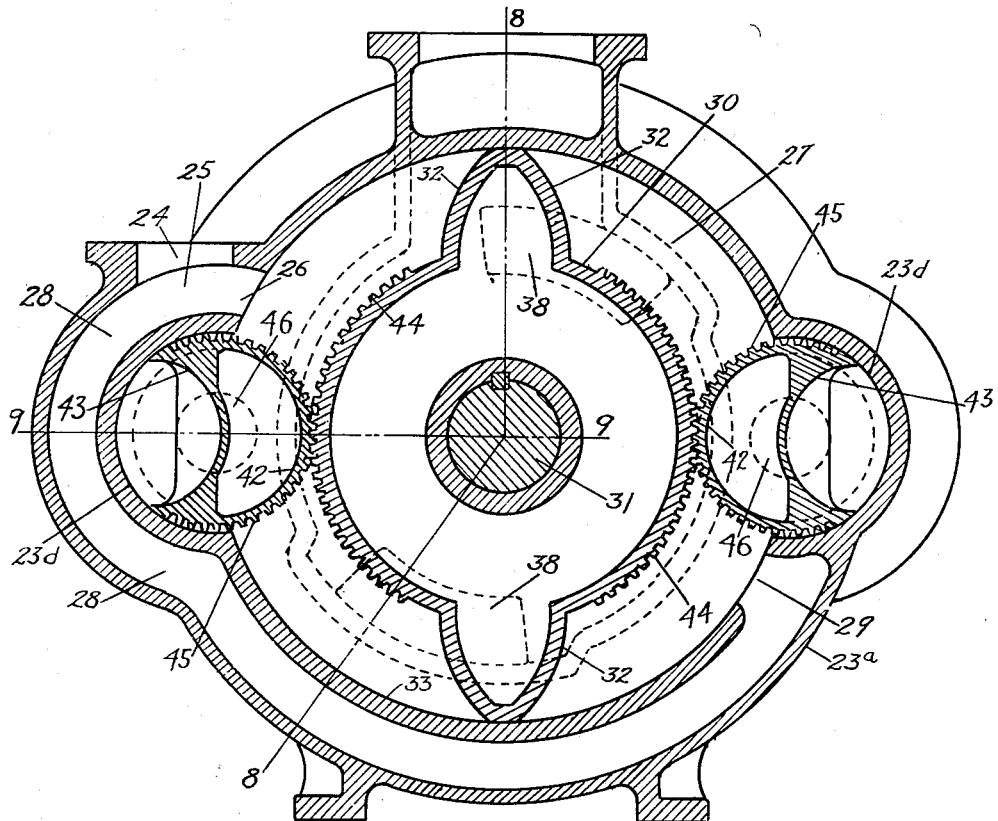
Fig. 5 is a section on the line 5—5 in Figs. 8 and 9.
Figures 6, 7:
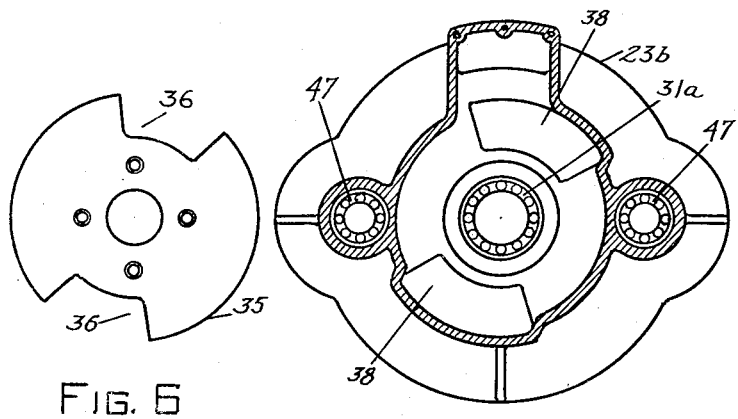
Fig. 6 is a detached elevation of one of the closure plates of the rotor.
Fig. 7 is a section on the line 7—7 in Fig. 8.

In the modification shown in Figs. 5, 6, 7, 8 and 9 much the same principle is involved, but the porting is slightly different. These structures have a case 23, an inlet opening 24, and a branch 25 from the inlet opening terminating at a port 26 which port leads to a compression space, or chamber 27. The case is made up of the central portion 23a and the sides 23b, the sides being secured to the central portion by bolts 23c. Another branch 28 of the inlet passage leads to a port 29 diametrically opposite the port 26, this port leading also to the space 27. A rotor 30 is fixed on a shaft 31 and the shaft is journaled by roller bearings 31a in the case. Vanes 32 are oppositely arranged on the rotor and close and sweep the compression space 27. A peripheral surface 33 of the case 23a forms a closure with these vanes and is provided with shoulders 33a which receive recesses 34 in the vanes. This shoulder also forms a more perfect joint between the sides of the case and the central portion.

The side walls of the rotor are provided with plates 35, the plates extending outwardly to the inner surface of the shoulder 33a. These plates as shown are on both sides of the compression space, but may be limited to one side of this space. The plates 35 form a closure with the side walls 37 of the case and are provided with ports 36 which operate in conjunction with ports 38 in the closure walls 37. The ports 38 lead to a passage 39 which extends annularly around the sides of the case and leads through a passage 40 in the central part of the case to an exhaust opening 41.

Gates 42 operate in pockets 23d in the case and have transfer grooves 43 as in the previous modification which receive and pass the abutments 32 in the same manner as the gates previously described. The rotor is provided with teeth 44 and the gates with teeth 45 making a labyrinth closure for these surfaces. The gates have trunnions 46 and these are journaled in the case by means of roller bearings 47. Gears 48 are fixed on the outer ends of the trunnions and these mesh with a gear 49 fixed on the shaft. The pitch line of these gears correspond to the pitch line of the rotor and gates. These gears drive the gates and rotor in proper timing as in the construction shown in Fig. 1. The operation corresponds to that of Fig. 1 except that the exhaust takes place through the side ports instead of the peripheral port as in the structure of Fig. 1.

In the modification shown in Figures 10 and 11, the rotors are provided with three vanes and the gates are provided with two gate-passing grooves. In this structure, 50 marks the case, 51 the inlet to the case. 53 branches from the inlet extending in the example shown entirely around the case. Ports 54 lead from the branches 53 to the compression space 55 which has the peripheral closing wall 55a and the side closing walls 50a and 52a. Driving shaft 56 is journaled by both bearings 56a in the walls of the case. A rotor 57 is fixed on the shaft. This rotor has an extending flange 58 on its other outer periphery which operates in relation to an annular extension 59 projecting from the cover portion 52a of the case. The flange is provided with a port 60 which operates in connection with a port 61 in the extension 59, these ports exhausting the fluid from the compression space to the exhaust passage 62 from which it is discharged through the opening 63. The opening 63 may be made to communicate with any receiving apparatus not shown.

There are three vanes 64 arranged on the periphery of the rotor. These vanes are adjacent to the ports 60 and sweep the closure walls 55a, 50a and 52a.

Rotor gates 65 are mounted in pockets 55b in the case. There are three of these gates. They are provided with trunnions 65a, and the trunnions are journaled in the case by ball bearings 66. Each gate is provided with a pair of grooves 65b.

The rotor is provided with a gear 67 which meshes with the gears 68 on the gates. The diameter of the gates is so in proportion with relation to the rotor that the gates make a half revolution for each third of a revolution of the rotor and, consequently, bring the grooves 65b in proper position to receive and pass the abutment 64. By providing a plurality of grooves 65b, the relative size of the rotor may be reduced.

Teeth 69 are arranged on the surface of the rotor and similar teeth 70 on the gates. These teeth are preferably of helical form and are continuations of the teeth of the gears 67 and 68. Preferably the teeth 69 and 70 are slightly more relieved than the teeth of the gears 67 and 68, so as to eliminate friction on the sealing parts of the gates and rotor. In general, the operation is similar to that of the previous structure. Air is drawn in from the inlet to the ports 54, forced by the abutments through the exhaust ports, the exhaust ports closing during the passing of the abutments through the gates. The gates seal the compression space during the compression movement of the abutments.

What I claim as new is:

In a blower, the combination of a case; a rotor mounted in the case, said rotor being spaced with relation to the case to form a compression space, said rotor and case having inlet and exhaust ports controlled by the movement of the rotor; a fluid driving vane on the rotor closing and sweeping the space between the rotor and case; a rotary gate; a gear fixed with the rotor; a gear fixed with the gate meshing with the gear fixed with the rotor and teeth forming a labyrinth closure between the rotor and gate, said teeth being formed in continuation of the teeth of the gears, the driving surfaces of the gears and the surfaces of the labyrinth being related to substantially relieve the labyrinth surfaces of driving contact and the surfaces of the gears to maintain substantially the entire driving load on the surfaces of the gears.

JOSEPH E. WHITFIELD.